US010004221B2

(12) United States Patent
Huffman et al.

(10) Patent No.: US 10,004,221 B2
(45) Date of Patent: *Jun. 26, 2018

(54) ALERTING SYSTEM FOR AUTOMATICALLY DETECTING, CATEGORIZING, AND LOCATING ANIMALS USING COMPUTER AIDED IMAGE COMPARISONS

(71) Applicant: Metecs, LLC, La Jolla, CA (US)

(72) Inventors: Robert Kenneth Huffman, Bandera, TX (US); Daniel David Jordan, League City, TX (US); Chadwick Jason Zalkin, League City, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/664,616

(22) Filed: Jul. 31, 2017

(65) Prior Publication Data

US 2018/0014527 A1 Jan. 18, 2018

Related U.S. Application Data

(63) Continuation of application No. 14/804,238, filed on Jul. 20, 2015, now Pat. No. 9,750,238.

(60) Provisional application No. 62/027,965, filed on Jul. 23, 2014.

(51) Int. Cl.
*A01N 31/00* (2006.01)
*H04N 7/18* (2006.01)
*A01M 31/00* (2006.01)
*A01K 29/00* (2006.01)
*G06K 9/00* (2006.01)

(52) U.S. Cl.
CPC ......... *A01M 31/002* (2013.01); *A01K 29/005* (2013.01); *G06K 9/00771* (2013.01); *H04N 7/181* (2013.01); *H04N 7/188* (2013.01)

(58) Field of Classification Search
CPC ............... A01K 29/005; A01M 31/002; G06K 9/00771; G06T 7/0044; H04N 7/181; H04N 7/188
See application file for complete search history.

(56) References Cited

U.S. PATENT DOCUMENTS 8,704,668 B1 4/2014 Darrell
2011/0280442 A1 11/2011 Chen
2014/0201844 A1 7/2014 Buck

*Primary Examiner* — Siamak Harandi
(74) *Attorney, Agent, or Firm* — Buche & Associates, P.C.; John K. Buche; Bryce A. Johnson

(57) ABSTRACT

Described are systems for (a) monitoring real-time animal activity in an area of interest using computer aided image comparison of a real-time image of the area and reference images of animals of interest and (b) providing informed alerts to a user.

7 Claims, 8 Drawing Sheets

Start
Realtime Camera Images of "static scene"
"Learn" scene background
No
Is the background still valid
Yes
Realtime Camera Images of scene
Subtract background from scene to detect objects
Reference Images of Animals of Interest
Are objects detected?
Yes
For each object: Is the object a currently tracked entity?
No
Is the object a new match?
No
Save image to unknown images folder
No
Yes
Yes
"Create" and "categorize" the a new entity
Save image to categorized images folder
Save image to the new categorized images folder
Alert user to new entity based on user defined rules

ALERTING SYSTEM FOR AUTOMATICALLY DETECTING, CATEGORIZING, AND LOCATING ANIMALS USING COMPUTER AIDED IMAGE COMPARISONS

CROSS-REFERENCE TO RELATED APPLICATIONS

This document is a continuation of U.S. patent application Ser. No. 14/804,238 (filed Jul. 20, 2015) entitled "Alerting system for automatically detecting, categorizing, and locating animals using computer aided image comparisons." That document claims the benefit and priority of U.S. Prov. Pat. App. Ser. No. 62/027,965 (filed Jul. 23, 2014). Both documents are hereby incorporated by reference in their entirety.

STATEMENT REGARDING FEDERALLY SPONSORED RESEARCH OR DEVELOPMENT

Not applicable.

BACKGROUND OF THE INVENTION

Field of Invention

The disclosed subject matter is in the field of systems and apparatus for (a) automatically detecting, categorizing, and locating animals using computer aided image comparisons and (b) alerting a user to the detection of a preselected animal or activity of said preselected animal in an area of interest.

Background of the Invention

Sometimes, animal activity in a particular area of interest ("area of interest") is monitored. In particular, many are desirous of knowing the animal activity in an area of interest so that they can be alerted to the presence of a specific animal in the area or to a specific type of animal activity in an area. Game hunters, for instance, are frequently interested in game animals' presence around a lure (e.g., a deer feeder) so that the likelihood of a successful hunt is increased. Similarly, animal enthusiasts or scientists are interested in the presence of particular animals in an area for observational purposes. Finally, farmers monitor their crop and livestock areas for dangerous or destructive animals so that undesirable animal behaviors can be prevented or deterred.

In view of the foregoing, cameras have sometimes been used to record the animal activities of an area. However, such cameras are not always suitable for monitoring an area of interest. Reviewing camera images or videos in real-time is time consuming, and after-the-fact review of such images and videos results in delayed alerts of animal activities. Techniques like motion detection and time lapse photography have been employed to minimize the volume of real-time images or video to be analyzed while monitoring animal activity in an area of interest. However, these techniques are indiscriminate with respect to the types of animals that are detected, and frequently result in false alarms/alerts or the reporting of irrelevant animals or animal activities (e.g., a squirrel, or even wind, can cause the same alert as a game animal or a mountain lion).

It comes as no surprise that a need exists for improved systems and apparatus for (a) automatically detecting, categorizing, and locating animals using computer aided image comparisons and (b) alerting a user to the detection of a preselected animal or activity of said preselected animal in an area of interest.

SUMMARY OF THE INVENTION

An object of this disclosure is to describe systems for: (a) monitoring real-time animal activity in an area of interest using computer aided image comparison of a real-time image of the area and reference images of animals of interest, and (b) providing informed alerts to a user. Sometimes, the alerts can suggest potential responsive actions such as deterrents to the detected animal or its behavior. In a preferred embodiment, the system consists of a camera and a computer operated microprocessor mounted in a remote area of interest, e.g., in the vicinity of a game feeder. In another preferred embodiment, the system consists of a camera mounted in a remote area of interest, e.g., in the vicinity of a game feeder, connected wirelessly to a centrally located computer operated microprocessor. In one instance, the microprocessor is loaded with reference images of animals. In one mode of operation, the system "learns" the static background of the area of interest (i.e., the appearance of the area without any moving objects) while real-time images are continuously provided by the camera to the microprocessor. The program algorithms compare the real-time images of the area to the static reference background image to identify any areas of incongruity between the static image and the real-time images. Suitably, reference images of animals of interest are compared to the incongruities in the real time images to determine whether the incongruity in the real time image is an animal of interest (e.g., by comparing the shape, size, and color of the incongruities with the animals in the reference images; image entropy, edge detection, and face detection algorithms might also be incorporated into the comparison protocols). If, after comparison, the incongruities in the real-time images have a match with the reference images, then a wireless signal alerts the user. If the detected animal is relevant, the user is notified of the animal's presence and activity in the area.

Other objectives and desires may become apparent to one of skill in the art after reading the below disclosure and viewing the associated figures. Also, these and other embodiments will become apparent from the drawings.

BRIEF DESCRIPTION OF THE FIGURES

The manner in which these objectives and other desirable characteristics can be obtained is explained in the following description and attached figures in which.

It is to be noted, however, that the appended figures illustrate only typical embodiments of the disclosed assemblies, and therefore, are not to be considered limiting of their scope, for the disclosed assemblies may admit to other equally effective embodiments that will be appreciated by those reasonably skilled in the relevant arts. Also, figures are not necessarily made to scale.

DETAILED DESCRIPTION OF PREFERRED EMBODIMENTS

Described are systems for (a) monitoring real-time animal activity in an area of interest using computer aided image comparison of a real-time image of the area and reference images of animals of interest and (b) providing informed alerts to a user. In a preferred embodiment, the system consists of a camera and a computer operated microprocessor mounted in a remote area of interest. In another preferred embodiment, the system consists of a camera mounted in a remote area of interest, wherein the camera is connected wirelessly to a computer operated microprocessor. In one instance, the microprocessor is loaded with reference images of animals. In one mode of operation, the system "learns" the static background of the area of interest (i.e., the appearance of the area without any moving objects) while real-time images are continuously provided by the camera to the microprocessor. The program algorithms compare the real-time images of the area to the static reference background image to identify any incongruity in the real-time images. Suitably, reference images of animals of interest are compared to the incongruities in the real time image to determine whether the incongruity in the real time image is an animal of interest (e.g., by comparing the shape, size, and color of the incongruities with the animals in the reference images; image entropy, edge detection, and face detection algorithms might also be incorporated into the comparison protocols image entropy, edge detection, and face detection algorithms might also be incorporated into the comparison protocols). If, after comparison, the real-time images have a match with the reference images, then a wireless signal alerts the user. If the detected animal is relevant, the user is notified of the animal's presence and activity in the area.

Figure 1:
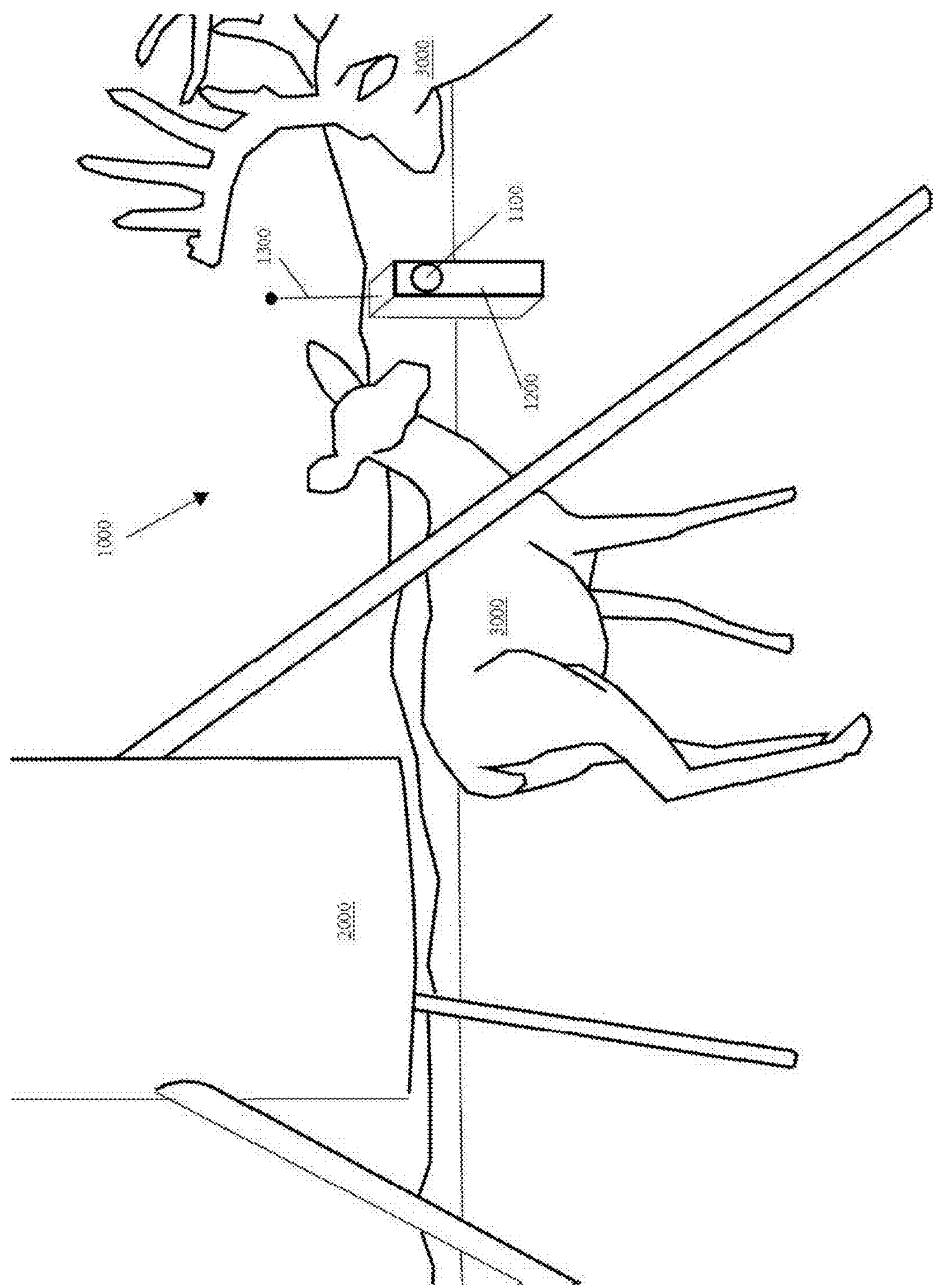
FIG. 1—is an environmental view of an area of interest, which view illustrates a notional remote setup of the disclosed system.

FIG. 1 presents a notional description of the remote camera sensing setup for the system 1000. Suitably, the system consists of a camera 1100, microprocessor 1200, and wireless communication device 1300 mounted in a remote area of interest, e.g., the area in the vicinity of a deer feeder 2000. Suitably, the camera 1100 is configured to capture images or videos of the area of interest and load those images to the microprocessor. In a preferred embodiment, the microprocessor 1200 (a) is pre-loaded with references images of animals of interest, (b) is continually learning the appearance or background of the area in a static state (i.e., without any animals or movement) by a constant photo or video feed from the camera (e.g., to account for snow melt, changes in lighting conditions (shadow movement), movement of the camera or feeder), and (c) is configured to compare the images or video images taken by the camera with the reference images to determine the type, size, and color of animals entering the area of interest. A wireless communication unit 1300 is provided for sending alerts regarding the animal's information.

Figure 2:
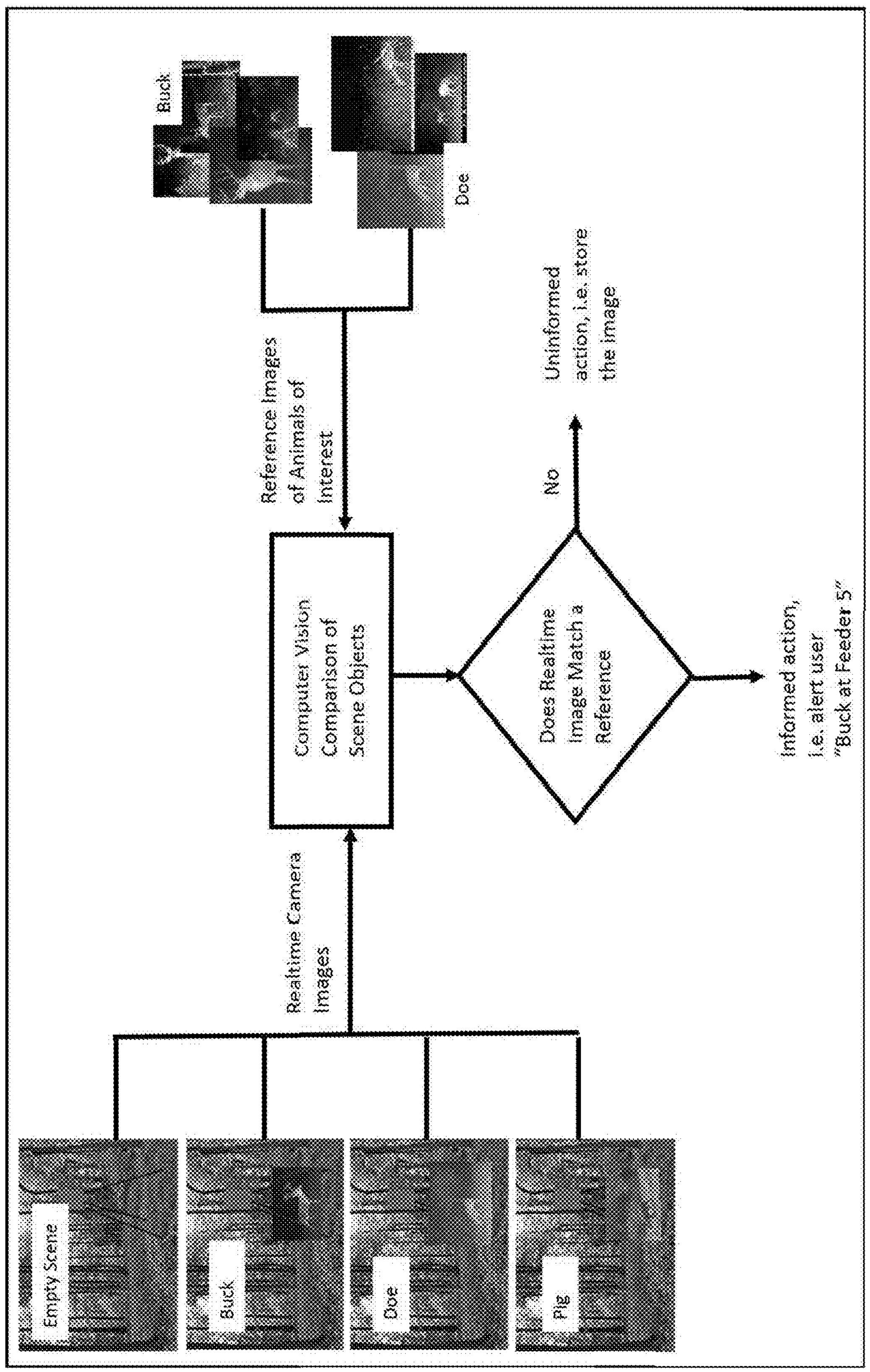
FIG. 2—is a high level logic flowchart for the algorithms controlling the system.

As alluded to above, the microprocessor 1200 features computer code in the form of computer image comparison algorithms for comparing images or video from the camera with reference images of animals of interest. FIG. 2 is a high level logic flowchart for the algorithms that control this functionality. First, an image of the static state background or appearance of the area is learned. The learning of the static background or appearance of the area is discussed in greater detail below with reference to FIG. 3. Second, reference images of animals of interest and a static image of the area of interest may be input and stored in the onboard computer microprocessor. In a preferred embodiment, for instance, images of a male deer ("buck") or female deer ("doe") taken from different angles or orientations may be loaded on the microprocessor. For instance, there may be images reflecting a buck in a left-side orientation, a right side orientation, a front orientation, or a back orientation. Preferably, the reference image could be an empty scene (i.e., no animals) in the area of interest). Suitably, the reference images could be of any animal. In the preferred embodiment, the reference images are designed to characterize a particular animal in a multitude of orientations. The number of reference images for a particular animal or empty/static background image is not set, but a larger number of reference images would typically yield a higher potential for a match between the reference images and the real-time camera images.

Third, with the reference images stored on the microprocessor (1200, FIG. 1), the camera (1100, FIG. 1) feeds real-time images to the microprocessor. By employing unique computer comparison algorithms discussed in greater detail below, the microprocessor 1200 compares the shape, size, and color of the objects in the real-time camera images to the reference images. In an alternate embodiment, image entropy, edge detection, and face detection algorithms might also be incorporated into the comparison protocols of the reference image and the incongruity. Finally, if a match is found, the object in the real-time image is designated as the animal of the type corresponding to the reference image and categorized. When a positive match occurs with one of the reference images, additional processing will occur, including sending a wireless signal to alert the user that an animal of interest has been spotted at the area of interest. This alert is designated as an informed action. Whenever a positive match does not occur with a reference image, no message or alert will be sent to the user and the image is stored or deleted. This alert is an uninformed action.

Figure 3:
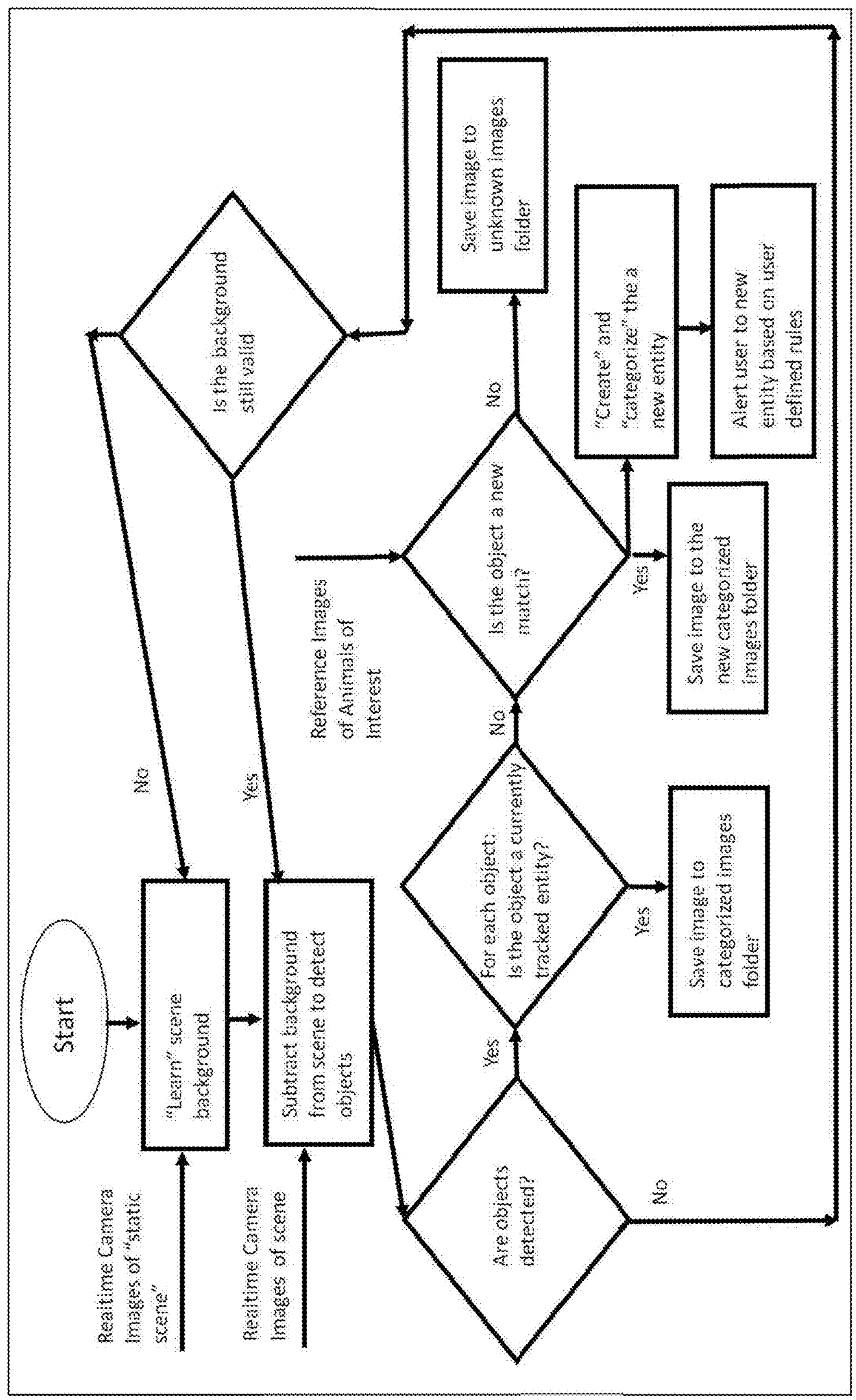
FIG. 3—is a detailed logic flowchart of the algorithms controlling the system.
Figure 4A:
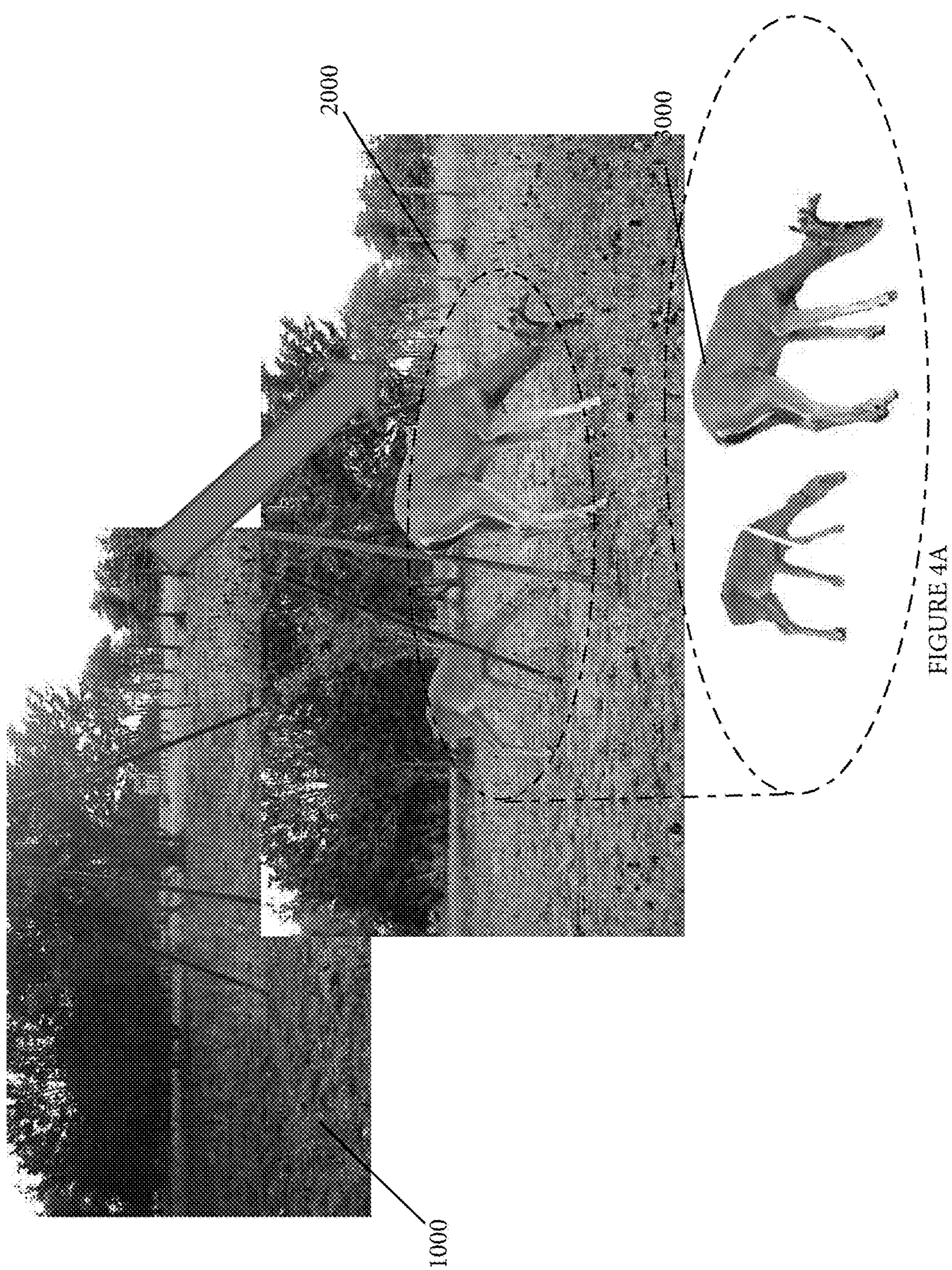
FIG. 4A—is an illustrative view of the system.
Figure 4B:
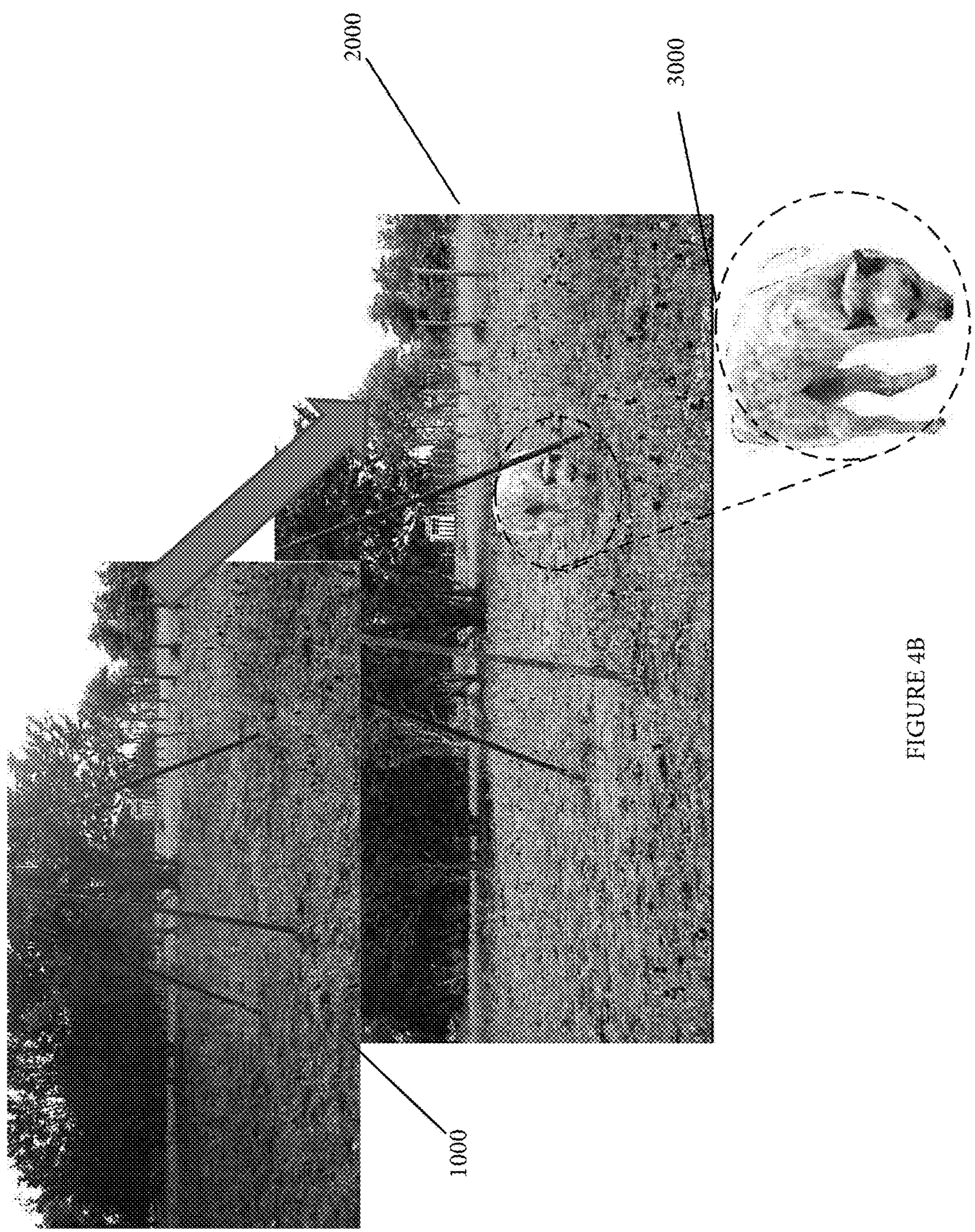
FIG. 4B—is an illustrative view of the system.
Figure 4C:
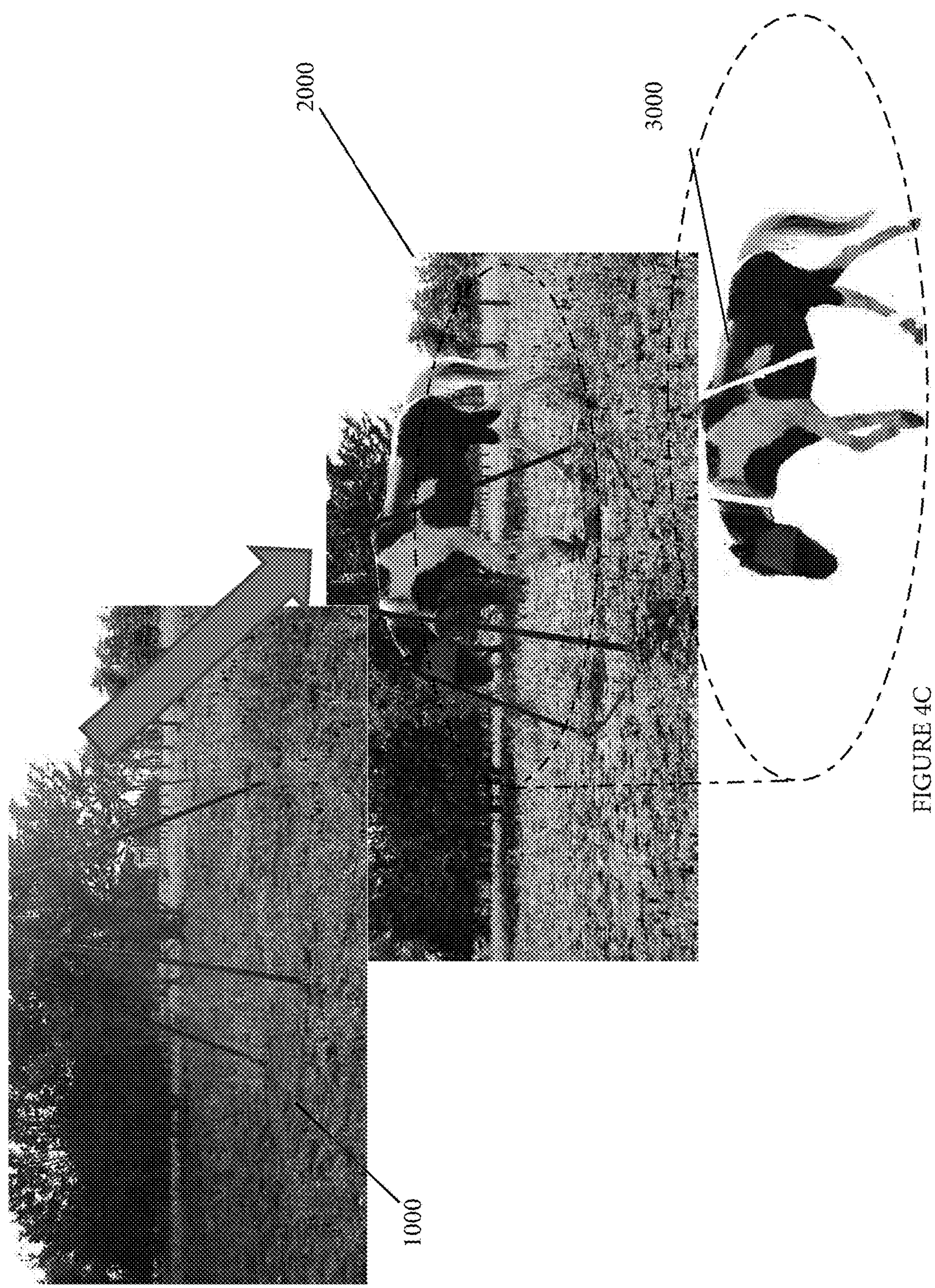
FIG. 4C—is an illustrative view of the system.
Figure 4D:
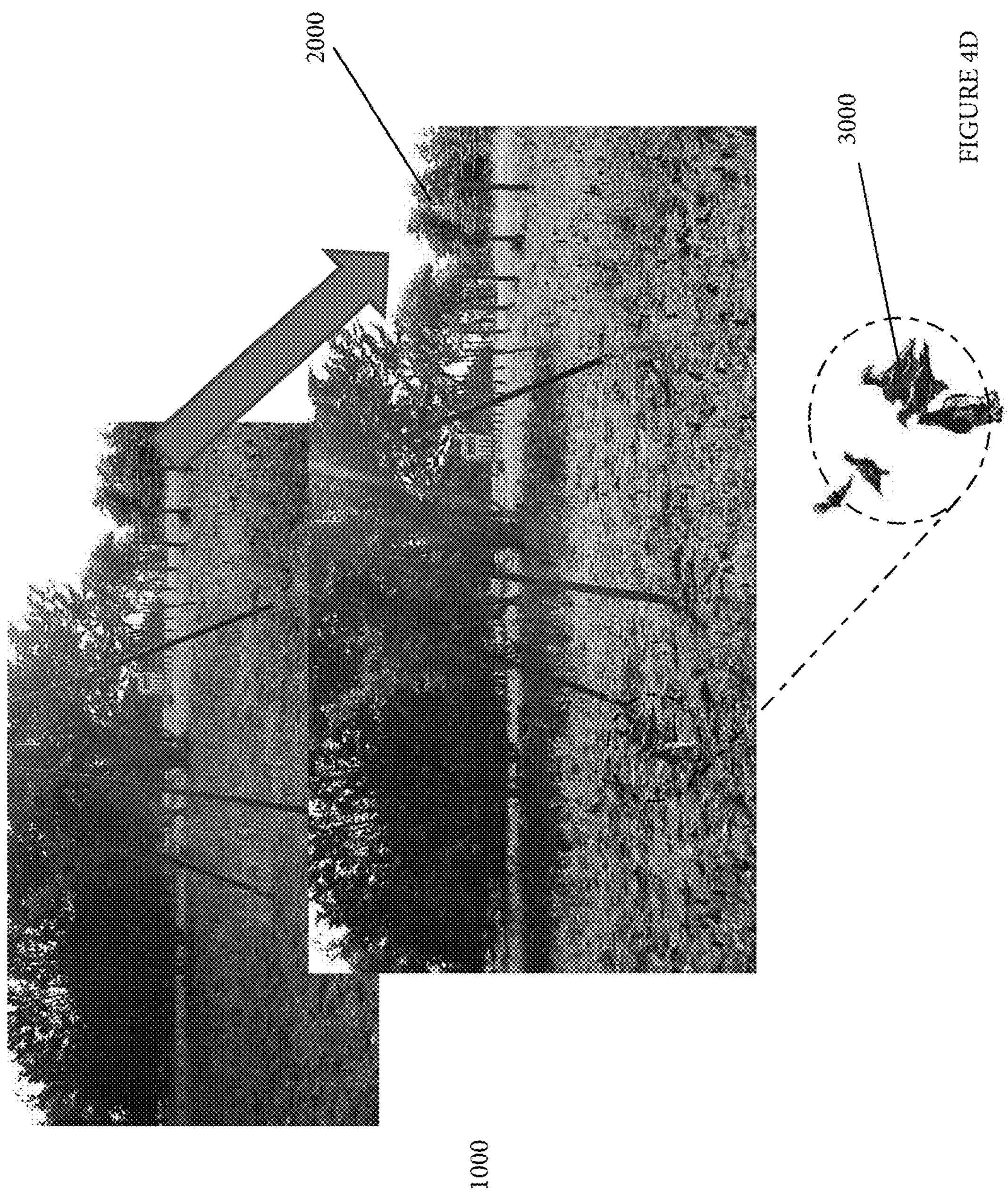
FIG. 4D—is an illustrative view of the system.

FIG. 3 presents a detailed flowchart of the computer vision based algorithm. In the algorithm, the first step is to learn the empty/static background image or appearance of the area of interest. Suitably, the static or empty scene reference image is the theoretical image of the area without any moving objects. In one embodiment, the system learns the background as follows: a video or photo stream is delivered to the system while all animal detection and tracking is disabled; next, the system watches the scene and measures the frame-to-frame foreground, as calculated from a simple frame subtraction wherein the subtraction is done in rectangular subsections of the scene, which has been portioned into a grid of configurable size. Each subsection of the grid is compared to the corresponding subsection in the next frame of the photo or video stream, and when that section of the grid has "settled" (meaning very little motion), that subsection is considered complete and the image in that subsection is stored as the static background for that subsection; finally, as soon as all subsections of the grid have a completed static image, the full static background is stitched together from all the background subsections and stored in the system. In summary, the background learning algorithm (1) splits the frames of a photo or video stream into a grid, (2) processes the photo or video stream for zero motion in each grid section, (3) stores each still grid section, and (4) stiches a static background together with the stills of each grid section. For non-volatile (e.g. areas of little weather or activity), the static background is learned quickly, for volatile scenes with a lot of motion, the static background may take time to learn. Suitably, configurable thresholds for learning time, grid size, etc. may be set to the system. The background learning algorithm suitably prevents the need for the user to "set the background", although, in a different embodiment, a simple image of the background without any animals may be used to set the static image. In that case, to account for real-life situations that involve non-static areas due to wind and other factors, a filtering technique may be employed to account for any small variations in images of the static or empty area of interest.

With the reference image of the static area of interest loaded on the microprocessor, real-time images of the area of interest are loaded on the microprocessor from the camera wherein overlapping aspects of the reference image and real-time image are subtracted from each other to identify incongruities between the images. FIGS. 4A through 4D illustrate this process. As shown in those figures, the reference image 1000 is compared with a real time image 2000. Preferably, overlapping aspects of the reference image and real-time image are subtracted from each other to identify incongruities 3000 between the images. In FIGS. 4A through 4D, incongruities 3000 are identified in the form of deer, a dog, a horse, and birds.

Figure 5:
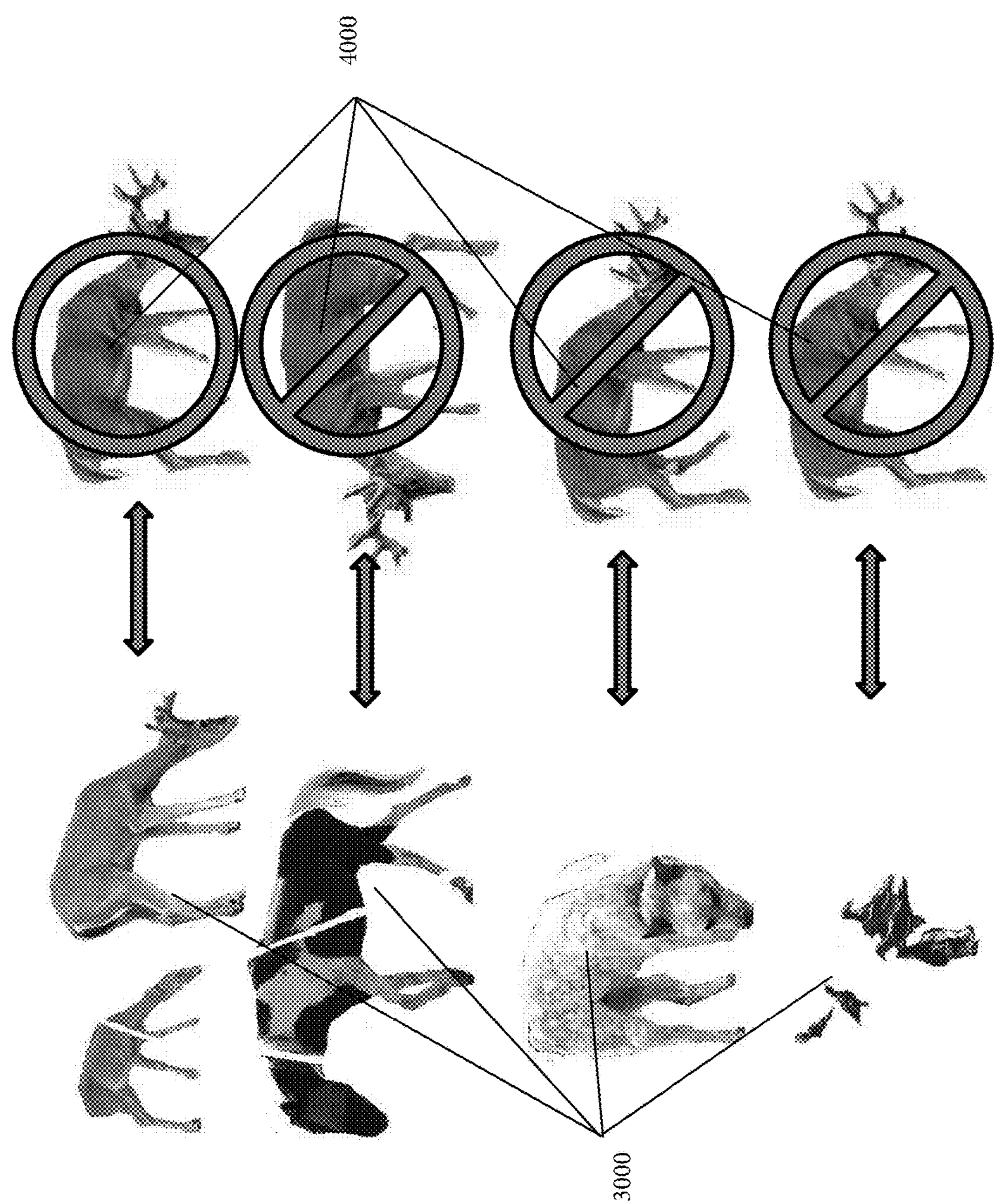
FIG. 5—is an illustrative view of the system.

If any incongruities are identified, then the incongruity is compared with the reference images of animals to determine whether the incongruity matches the reference images (e.g., a previously identified buck or doe). This process is illustrated by FIG. 5, which compares the incongruities 3000 of FIGS. 4A through 4D with a reference image of a buck 4000. As shown, only the reference incongruity of FIG. 4A matches with the reference image. When a match occurs, the scene image is saved to a gridded images folder and becomes a future reference image. When a match occurs an alert is sent to a user regarding the match.

In one embodiment, the system may be used to track specific animals or entities that frequent the area of interest. In this embodiment, if the object has not been previously identified, the object is compared against the stored reference images to determine if it is a new match with respect to the reference images (e.g., the object is a new buck or doe in the scene). When new animals are detected at an area of interest, an alert is delivered via wireless communication and the scene image with the new animal is stored in the "new" categorized images folder. When a reference detects an incongruity with the empty/static background image that cannot be matched with a reference image, the scene image is saved to the unknown images folder. If no objects are detected, the background learning algorithm may be employed to reset the static state image.

Example 1—Distinguishing a Doe v. Buck

In one example of a typical use, the system may be used to alert a hunter to the presence of a buck, but not does, in a particular area of interest. First, the camera, microprocessor, and wireless communication device can be established in the area of interest. Second, a static image of the area of interest may be loaded into or learned by the microprocessor. Next, reference images of bucks and does can be loaded into the microprocessor. After setup, the camera may begin sending real-time images or video to the microprocessor wherein the images are compared programmatically to the static image of the area. If incongruities exist between the static image and the real-time image, then the size, shape and color of the incongruities are programmatically compared to the size, shape, and color of the bucks and does in the reference images. When a match occurs between the incongruity and the reference images for bucks, an alert is sent to the user that a buck is in the area.

Example 2—Distinguishing a Buck v. Horse

In one example of a typical use, the system may be used to alert a hunter to the presence of a buck, but not horses or other farm animals, in a particular area of interest. First, the camera, microprocessor, and wireless communication device can be established in the area of interest. Second, a static image of the area of interest may be loaded into the microprocessor or learned by the system. Next, reference images of bucks and horses can be loaded into the microprocessor. After setup, the camera may begin sending real-time images or video to the microprocessor wherein the images are compared programmatically to the static image of the area. If incongruities exist between the static image and the real-time image, then the size, shape and color of the incongruities are programmatically compared to the size, shape, and color of the bucks and horses in the reference images. When a match occurs between the incongruity and the reference images for bucks, an alert is sent to the user that a buck is in the area.

Example 3—Distinguishing a Particular Prize Buck v. a Young Buck

In another example of a typical use, the system may be used to alert a hunter to the presence of a prize buck, but not young bucks, in a particular area of interest. First, the camera, microprocessor, and wireless communication device can be established in the area of interest. Second, a static image of the area of interest may be loaded into the microprocessor or learned by the system. Next, reference images of a particular prize buck and regular bucks and can be loaded into the microprocessor. After setup, the camera may begin sending real-time images or video to the microprocessor wherein the images are compared programmatically to the static image of the area. If incongruities exist between the static image and the real-time image, then the size, shape and color of the incongruities are programmatically compared to the size, shape, and color of the Prize bucks and young bucks in the reference images. When a match occurs between the incongruity and the reference images for the prize buck, an alert is sent to the user that the particular prize buck is in the area.

Other features will be understood with reference to the drawings. While various embodiments of the method and apparatus have been described above, it should be understood that they have been presented by way of example only, and not of limitation. Likewise, the various diagrams might depict an example of an architectural or other configuration for the disclosed method and apparatus, which is done to aid in understanding the features and functionality that might be included in the method and apparatus. The disclosed method and apparatus is not restricted to the illustrated example architectures or configurations, but the desired features might be implemented using a variety of alternative architectures and configurations. Indeed, it will be apparent to one of skill in the art how alternative functional, logical or physical partitioning and configurations might be implemented to implement the desired features of the disclosed method and apparatus. Also, a multitude of different constituent module names other than those depicted herein might be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "module" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

The claims as originally filed are incorporated by reference in their entirety.

We claim:

1. A system for (a) monitoring real-time animal activity in an area of interest using computer aided image comparison of a real-time image of the area and reference images of animals of interest and (b) providing informed alerts to a user regarding animal type in said area, where the system comprises:

a camera;

a computer operated microprocessor;

wireless communication device;

a receiver;

wherein the camera, computer operated microprocessor, and wireless communication device are mounted in an area of interest that is remote relative to the receiver;

wherein the camera is connected wirelessly to the computer operated microprocessor;

where the camera is configured to provide both a first video or photo stream of images of the area and a second video photo stream of images of the area to the microprocessor;

wherein the wireless communication device is configured to send alerts to the receiver;

wherein the microprocessor is loaded with the reference image of the animal;

wherein the microprocessor features a program algorithm for learning a static background image of the area of interest from the first video or photo stream of images of the area of interest, where the static background image represents an appearance of the area without any moving objects;

wherein the program algorithm executes on the microprocessor to obtain the static background image of the area of interest;

where the program algorithm executes on the microprocessor a comparison of the images of the second video or photo stream to the static background image to identify an incongruity between the images of the second video or photo stream and the static background image;

where the program algorithm executes on the microprocessor a comparison of the incongruity and the reference images of the animal of interest and determines that the incongruity in the real time image represents the animal of interest;

wherein a wireless signal alerts the receiver of the determination that the incongruity in the real time image represents the animal of interest; and, wherein the program algorithm executes a high level logic flowchart to obtain the static background image of the area of interest as follows:

identifying the first video or photo stream of images in the microprocessor and (i) splitting each image of the first video or photo stream into a grid of sections, (ii) comparing every section of a grid of a first image of the first video or photo stream with corresponding sections of the grids from every other image of the first video or photo stream to identify a minor variance in each grid section, (iii) storing each grid section with the associated minor variance in the microprocessor, and (iv) stitching the stored grid sections with associated minor variance together so that the static background image is defined by the stitched together grid sections.

2. The system of claim 1, where the system further comprises:

where the program algorithm executes on the microprocessor a comparison of the images of the second video or photo stream to the static background image to identify an incongruity between the images of the second video or photo stream and the static background image, where the images of the second video or photo stream of the area of interest are overlapped with the static state background or appearance so that overlapping aspects of the static background image and the images of the second photo stream are subtracted from each other to identify the incongruity.

3. The system of claim 2, where the system further comprises:

where the comparison of the incongruity and reference image of the animal involve comparing the shape, size, and color of the incongruity with the shape, size, and color of the animal in the reference image of the animal.

4. The system of claim 3, where the computer operated microprocessor is a smartphone.

5. The system of claim 2, where the computer operated microprocessor is a smartphone.

6. The system of claim 1, where the system further comprises:

where the comparison of the incongruity and reference image of the animal involve comparing the shape, size, and color of the incongruity with the shape, size, and color of the animal in the reference image of the animal.

7. The system of claim 1, where the computer operated microprocessor is a smartphone.

* * * * *